United States Patent [19]

Sipos

[11] 4,229,766
[45] Oct. 21, 1980

[54] SCANNING APPARATUS AND METHOD FOR OPERATING THE APPARATUS

[75] Inventor: Balint Sipos, Erlangen, Fed. Rep. of Germany

[73] Assignee: Siemens Aktiengesellschaft, Berlin & Munich, Fed. Rep. of Germany

[21] Appl. No.: 903,111

[22] Filed: May 5, 1978

[30] Foreign Application Priority Data

May 5, 1977 [DE] Fed. Rep. of Germany ....... 2720235
May 5, 1977 [DE] Fed. Rep. of Germany ....... 2720261

[51] Int. Cl.² .................... H04N 5/30; H04N 5/66
[52] U.S. Cl. ............................. 358/209; 358/230; 358/240; 313/485; 315/169.4; 340/772
[58] Field of Search .......... 358/240, 230, 59, 241, 358/209, 217; 313/484, 485; 315/169.4; 340/771, 772

[56] References Cited

U.S. PATENT DOCUMENTS

| | | | |
|---|---|---|---|
| 3,559,190 | 1/1971 | Bitzer et al. | 358/240 X |
| 3,801,864 | 4/1974 | Yamane et al. | 358/240 X |
| 3,956,667 | 5/1976 | Veith | 358/240 X |

Primary Examiner—Robert L. Richardson
Attorney, Agent, or Firm—Kenyon & Kenyon

[57] ABSTRACT

Image scanning apparatus, such as an image pickup device with a photo cathode in a vacuum system or a flat display device with a thermal cathode, having at least one hole matrix for row and column control of the electron stream between its cathode and anode, and at least two separately controllable electrodes for controlling the rows and columns of each row of holes of the hole matrix, the electrodes being arranged in separate planes and tied together in jointly controllable groups permitting a small distance between the cathode and the anode thereby providing a flat camera or display in a television system.

12 Claims, 16 Drawing Figures

SCANNING APPARATUS AND METHOD FOR OPERATING THE APPARATUS

BACKGROUND OF THE INVENTION

This invention relates to scanning apparatus disposed in a vacuum system in general and more particularly to a flat camera or display device for use in television systems.

In one known image pickup tube of a television camera, the image picked up by an objective lens is converted into electrical signals. The tube contains an image converter part which generates an electric charge image from the optical image, by means of a photo cathode or a semiconductor layer, which is stored in a storage plate of the image converter. In an adjacent scanning arrangement, the storage plate is scanned by an electron beam. The scanning beam is controlled by the same clock generator which also furnishes the synchronizing pulses. A load resistor is connected into the circuit of the scanning beam as an electronic component. The voltage drop of load resistor is determined by the electron current of the scanning beam and the video signal is taken off this resistor. Since the image converter and the scanning device are connected in series in the direction of the signal flow and a certain minimum depth is necessary for scanning with an analog-controlled electron beam, a flat arrangement cannot be obtained with this design.

In one known display device, a thermal cathode and a hole matrix with an electrode arrangement for row and column control, as well as the picture screen, are arranged in a vacuum chamber. This display device contains electrodes which can be driven by binary signals and which are arranged in 18 planes parallel to and one behind the other, for instance, for controlling 512×512 picture elements. The electrodes of the individual planes are separated from each other by insulating planes which contain holes, assigned to individual picture elements, for the electron stream. The electrodes comprise conducting strips arranged on the hole plate. They are likewise provided with holes assigned to individual picture elements. The electrodes of the individual planes are tied together in groups and are provided with common control leads. Of the 18 electrode planes, 9 are provided for row control and 9 for column control. The large number of electrode planes and the insulating layers arranged between them produce a relatively thick control arrangement. A long path for the electrons which are released from the cathode and are accelerated in a direction toward the anode, in the canals which are formed by the matrix holes in tandem and are associated with the individual picture elements, is thus brought about (IEEE Trans. on Electron Devices, vol. ED-20, no. 11, Nov. 1973, pages 1052–1061).

SUMMARY OF THE INVENTION

It is an object of the present invention to control an image pickup or display apparatus arranged in a vacuum and containing a cathode as well as an anode by means of a simplified form of this known hole matrix arrangement in such a manner that it can convert picture information by means of digital scanning signals into an electronic signal sequence which can be transmitted by communications engineering means, or convert such a signal sequence for image reproduction.

It is now an object of the present invention to make the control, i.e., scanning arrangement, of the above-described vacuum display device or a corresponding image pickup thinner by reducing the number of electrode planes and to permit, by special grouping of the electrodes, the row an column control of the picture elements by means of digital control pulses in accordance with different logical code systems.

According to the present invention, to solve this problem, at least two separately controllable electrodes are provided in a control arrangement of the type mentioned at the outset, at least for the holes of the individual rows. The electrodes are arranged in separate planes parallel to the flat sides of at least one hole matrix. The electrodes of the first plane, arranged at a predetermined distance of at least three rows or three columns, respectively, always form a jointly controllable electrode group. In each of the further planes, at least three adjacent electrodes each form a jointly controllable group of electrodes. The highest controllable number of rows or columns is therefore the product of the number of electrode groups of the first and second plane.

In a special embodiment of the control arrangement, in which still more rows can be controlled with the same number of electrode groups per plane, electrodes of further row groups are cyclically connected in the second plane, at a predetermined distance, to the corresponding control line of this plane and are supplemental by a third plane, in which now all adjacent electrodes which are assigned to a respective group cycle of the previous plane, can be controlled jointly. The number of jointly controllable electrode groups of the different planes is then preferably chosen the same. With each further plane, the number of controllable rows is increased by another power. With a given number of rows Z, the relationship between the number of planes E and the number of groups n per plane is found from the relation $Z=n^E$. In a special embodiment of the control arrangement, in which the electrodes are arranged in more than two planes, a common hole matrix may also be provided for all electrodes.

In display apparatus of this type, a line is keyed bright if all electrodes associated with it receive a control voltage with "pass" potential. It is keyed dark if at least one of the electrodes associated with it receives a control voltage with cut-off potential, for instance, −5 V relative to the cathode.

The same arrangement and subdivision into groups and phases can preferably be provided for the electrodes for column control.

With pickup apparatus according to the present invention, stationary or varying picture information can be converted, by point-by-point scanning of the image transmitted by an optical system, into electronic signals which can be transmitted by communications engineering means. As the picture elements are scanned by a matrix arrangement of electrodes between the photo cathode and the anode instead of by a focused electron beam, the pickup apparatus can be designed as a flat structure. The video signal is taken off at the load resistor, which is connected into the anode circuit outside the vacuum.

Not only can photo cathodes which emit electrons through excitation of electromagnetic waves of the visible range of the wavelength be used, but also of the invisible range.

In a further embodiment of the control arrangement, all the electrodes of the different row and column planes can be arranged on a single hole matrix, which is preferably provided with grooves which run in the direction of the rows or columns, respectively on both flat sides, in which grooves the electrodes are arranged. These grooves are then parallel to each other and the grooves of the one flat side, in which, for instance, the control electrodes for the row scan are arranged, are at right angles to the grooves on the other flat side of the matrix, in which the electrodes for the column control are accommodated. In this embodiment, the grooves can extend advantageously into the matrix on both flat sides far enough that their intersections always form a hole for the electron stream.

One embodiment of an image pickup system according to the present invention is housed in a flat, hermetically sealed glass vessel which is evacuated to at least $10^{-3}$ Torr. A constant anode voltage of at least 30 V, which may be several kV and preferably is about 1 kV, is applied between a photo cathode and the anode. The electrons emitted from the cathode surface by illumination are accelerated by this anode voltage in a direction toward the anode. The photo cathode can also be illuminated via an objective lens or even directly by applying a picture, for instance, a slide. The density distribution of the current of electrons released from the cathode surface corresponds to the brightness distribution of the image on the photo cathode.

If care is taken that all the electrons released from the cathode do not reach the anode at the same time, but that only electrons of a limited area of the cathode surface, especially of an approximately point-size electrode area reach it at a given time, then the voltage drop at the load resistor in the anode circuit is proportional to the brightness of the point on the cathode. Thus, if the entire cathode surface is scanned point by point sequentially by lines, then the video signal, which is an a-c voltage with which a transmittor can be modulated, is generated at the load resistor.

For scanning, the electrodes are controlled so that the hole matrix is permeable for the electrons only at the desired point and is blocked at all other points. The receiver is also synchronized with the frequency of the scanning signals.

In a specific embodiment of the display device in the form of a color television picture tube, three adjacent column electrodes are always associated with fluorescent coatings of the anode. These coatings are then chosen so that they correspond to the three primary colors; the first one will then have, for instance, green fluorescence, the next one blue and the third one red fluorescence and this association with the three primary colors is then repeated cyclically through each of the following three columns. Corresponding to the strip-shaped column electrodes, the coatings for the anodes can also be made in the form of stripes and their dimensions can be adapted to the size of the column electrodes. For standard television sets, the width of these stripes will be a few tenths of a millimeter, e.g., 0.3 mm. Besides the stripe form a dot shape is also possible for these coatings on the anode which serves as the picture screen. It is also not necessary that the holes of the matrix be round; they can also be made as elongated holes, for example.

To operate this arrangement, sequential control of the individual picture elements in rows and columns is necessary. For sequential control of the rows, brightening pulses are applied sequentially in repeating control phases to the individual control groups of the first electrode plane. Simultaneously, the control groups of the second and further planes receive brightening pulses which last as long as the duration of a control phase of the respective preceding plane.

In substance, the display device consists of a thermal cathode, a so-called incandescent cathode which extends on the back side of the device at least approximately over the entire size of the picture, and at least one matrix, on the flat sides of which the control electrodes are arranged in separate planes, as well as of a fluorescent screen as the anode. The entire system is accomodated in a gastight vacuum system, which may preferably consist of glass and is evacuated to a vacuum of at least $10^{-3}$ Torr.

DETAILED DESCRIPTION OF THE INVENTION

Figure 1:
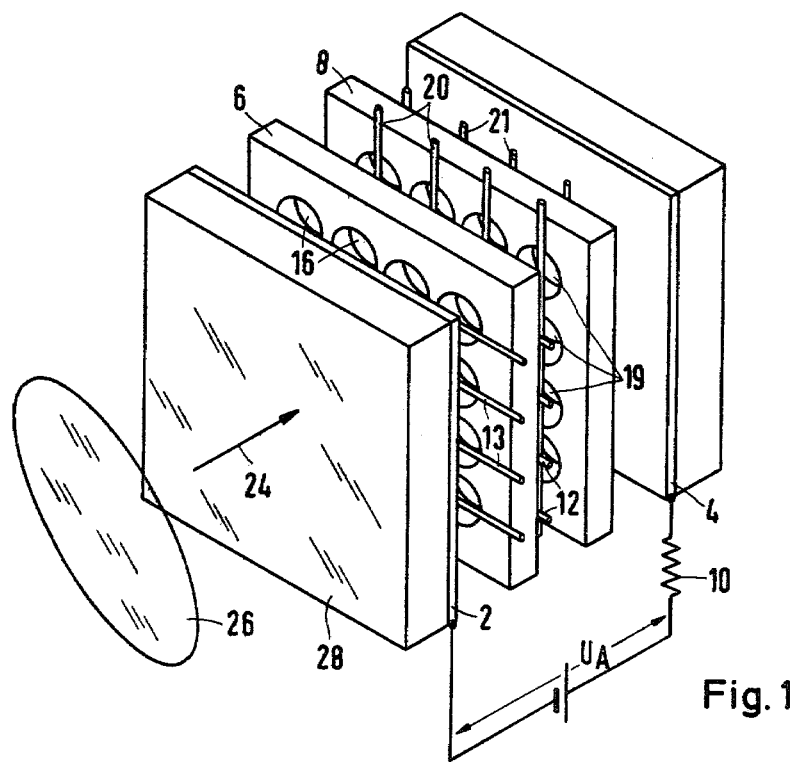
FIG. 1 is a diagrammatic illustration of an image pickup apparatus.

According to FIG. 1, two hole matrices 6 and 8, each of which is provided with holes for the electron stream, are arranged between a photo cathode 2 and an anode 4 associated therewith. Between the cathode 2 and the anode 4, a d-c voltage $U_A$ of, say, 1 kV is applied in series with an electronic component which, in the simplest embodiment of the apparatus, is shown as the load resistor 10 and at which video information can be taken off as a signal sequence.

The matrix 6 is provided with electrodes 12 and 13, which are arranged on opposite ones of the respective flat sides of the matrix 6 and therefore, in two separate planes. These electrodes are used for controlling the rows, of which only the holes of the upper row are provided with a reference numeral 16. Similarly, the hole matrix 8 is provided with electrodes 20 and 21, respectively, for the column control. In the figure, only the holes of the first column are designated with 19. The image information indicated in the figure by an arrow 24 is fed via an optical system shown as a converging lens 26 and a front wall 28, consisting of glass, of a vacuum system (not shown in further detail), to the cathode 2 of the image pickup apparatus. The cathode 2 is scanned by controlling the electrodes of the matrices 6 and 8 and the picture information is taken off at the load resistor 10 as a signal sequence which corresponds to the brightness distribution of the image at the cathode 2.

Figure 2:
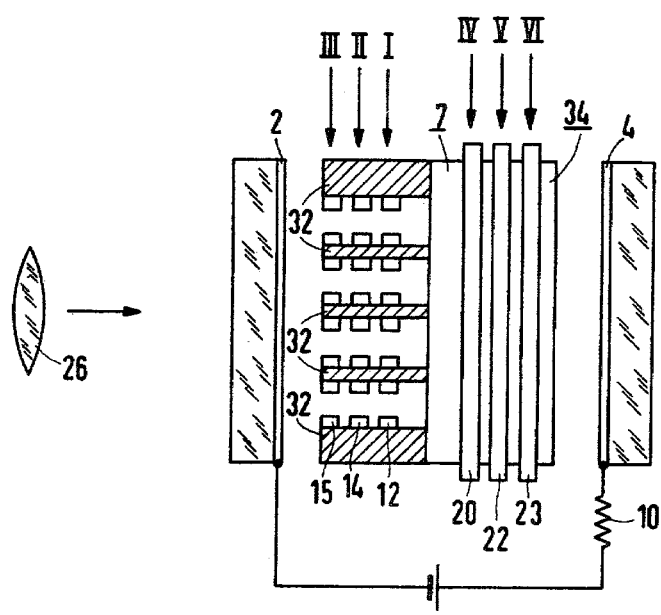
FIG. 2 is a cross section through a special embodiment of the image pickup apparatus.

In the embodiment of the image pickup apparatus according to FIG. 2, a common hole matrix 7 is provided between the cathode 2 and the anode 4. The control electrodes of hole matrix 7 for row and column control are arranged respectively, in groups of three different planes, I to III and IV to VI, respectively. The electrodes 12 and 14 for row control, with which further electrodes 15 are associated and form a third plane III, are arranged on horizontal ribs 32 in the different planes I to III one behind the other in the direction of the electron stream. Similarly, the electrodes 20 and 22, with which further electrodes 23 are associated and form a plane VI, are arranged on ribs 34 of the matrix 7, which are arranged vertically and side by side in the direction of the electron stream. The picture information supplied via the optical system 26 is fed, through the control of the electrodes in the planes I and III for the row of holes of the matrix 7 and through the control of the columns with the electrodes in the planes IV to VI, to the load resistor 10.

The electrodes in the planes I to III always make only the holes of one row of the matrix 7 permeable for the electron stream, and the vertically arranged electrodes in the planes IV to VI insure that only one hole of this row is sequentially permeable for the electron stream. Therefore, only one point of the cathode 2 is scanned at a given time for supplying the picture information.

So that television pictures, which change in time, can be transmitted, the scanning must be fast enough that at least 25 individual frames per second can be picked up sequentially. This means that if the picture is subdivided in the usual manner into 625 lines, the points of a row must be covered within 64 usec.

Arranging the electrodes 12 to 14 and 20 to 22 in separate planes makes it possible to step the electron streams assigned to the individual points of the picture along line by line, sequentially in one hole of the matrix or in several holes of the different matrices 6 and 8, which are associated with the same electron stream. The corresponding control signals can be coded in one of the logical number systems. Decimal as well as binary coding along with any other number system can be used.

Any point of the picture area of the cathode 2 can be selected with a small number of control elements. For this purpose, the electrodes 12 of plane I can be tied together, according to FIG. 3, for row stepping in groups $a_1$ to $k_1$, each of which are provided with a common connecting lead. These groups are controlled by the first decade of a decimal code. To group $a_1$, the electrode 12 of the first row, which is enclosed in the figure, together with the corresponding electrodes of the further planes II and III with a dash-dotted frame, and the eleventh, twenty-first, thirty-first electrode etc., are part of group $a_1$. Group $b_1$ includes the electrodes of the second row as well as the twelfth, twenty-second, etc., row. The further groups up to $k_1$ are connected accordingly. The electrodes of plane I are thus combined in 10 groups and are controlled by the first decade of the decimal code. In the second plane II, the electrodes 13 are likewise combined in groups, of which only the first three, $a_2$ to $c_2$, and the tenth, $k_2$, are indicated in the figure. Each of these groups consist of the electrodes of ten succeeding rows. The second electrode plane II thus contains likewise ten groups, which can be controlled by the second decade of the code. The electrodes 14 in the third plane III likewise contain ten groups each with one hundred adjacent electrodes. For the sake of simplicity, only part of the first group $a_3$ is shown and only three of the second group $b_3$ are indicated. They are controlled by the third decade of the code.

In a similar manner, electrodes in further planes can also be combined in groups, with the number of adjacent electrodes is always higher by a factor of 10 from plane to plane.

Similarly, the column electrodes arranged in planes IV to VI can be divided into groups and controlled as a group.

Figure 4:
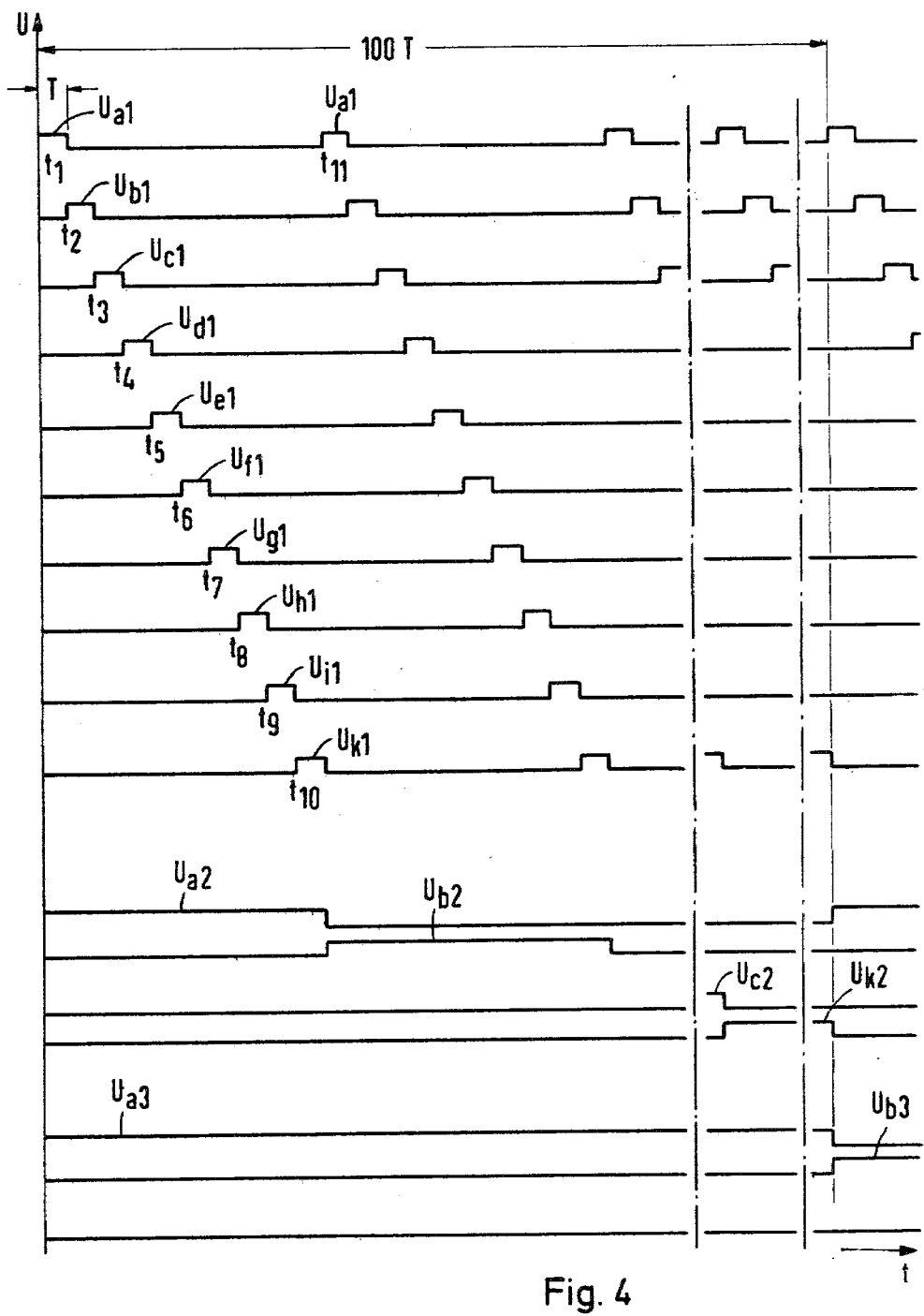
FIG. 4 illustrates the waveform of the control signals diagram.

According to the diagram of FIG. 4, the control inputs can be switched between two voltage levels $U_1$ and $U_2$ relative to the cathode 2; the one voltage level $U_1$ makes the associated matrix holes pass the electrons, while the other voltage level $U_2$ blocks the holes. In FIG. 4, the control voltages U are plotted as a function of the time t. At time $t_1$, for instance, the electrodes of group $a_1$ in plane I receive a control pulse, which makes the upper row of the electrodes 12 permeable. With this control pulse $U_{a1}$, a control pulse $U_{a2}$ is simultaneously transmitted for the electrode group $a_2$ of plane II. At the time $t_1$, a control pulse $U_{a3}$ is fed to the electrodes of group $a_3$ in plane III; this pulse $U_{a3}$ can also be triggered, for instance, by the control pulse $U_{a1}$. At the time $t_1$, therefore, only the row electrodes of the first row in all electrode planes are provided with a potential which makes the associated holes of this row permeable for the electron stream. In planes II and III, a control pulse is also received at the time $t_1$ by the electrodes of the following rows, for instance, in plane II up to the tenth electrode and in plane III of the electrodes 14 up to the hundredth row. The associated electrodes of plane I, however, are blocked. At the time $t_2$, the control pulse $U_{a1}$ is blocked and the second group $b_1$ of the electrodes 12 in plane I receives a control pulse $U_{b1}$, which makes the holes of this row permeable, since the corresponding electrodes of the same row in the electrode planes II and II still have a "pass" pulse. Similarly, the electrodes of group $c_1$ receive a control pulse $U_{c1}$ at time $t_3$, which makes the third row permeable. In the same manner, the following row is controlled at the respective times $t_4$ to $t_{10}$ by one of the control pulses $U_{a1}$ to $U_{k1}$. At the time $t_{11}$, group $a_1$ receives a new control pulse $U_{a1}$, which also triggers a control pulse $U_{b2}$ for group $b_2$ of the electrodes of plane II. This control pulse $U_{b2}$ for the second group of electrodes in plane II lasts, like the control pulse $U_{a2}$, until the control pulses for the electrode groups $a_1$ to $k_1$ of the electrode plane I have been run through. The associated electrodes of plane III still have their "pass" pulse $U_{a3}$, which lasts to the tenth run of the control pulses for the electrode groups of plane II. In this system, one thousand rows, for instance, can be driven sequentially. The same system can preferably be used for controlling the columns.

An advantageous grouping of the control electrodes 12 to 14 and 20 to 22 is obtained from $Z=n^E$, where Z is the total number of rows, E the number of electrode planes and n the number of the electrode groups of a plane and at the same time the base of the number system, with which the control is coded. Thus, one hundred rows, for instance, can be controlled by a two-digit decimal code with electrodes in two planes.

The image pickup apparatus according to the present invention is also suitable for the line interleaving system in common television, where first, all uneven-numbered lines and then all even-numbered lines are written.

For color pickup, the apparatus can be constructed, as in conventional color cameras, with electron beam scanning either as a three tube system with a prism divider or as a single tube system with its stripe filter. It is a particular advantage of the apparatus according to the present invention that it can also be used for image reproduction. If the photo cathode 2 is illuminated with homogeneous light and the control electrodes are driven by a received video signal and the anode 4 is at the same time constructed as a fluorescent anode, then the device can also serve as an image reproduction screen. If the apparatus, so modified, is used for taking pictures, then the fluorescent anode can be considered as a monitor.

Figure 5:
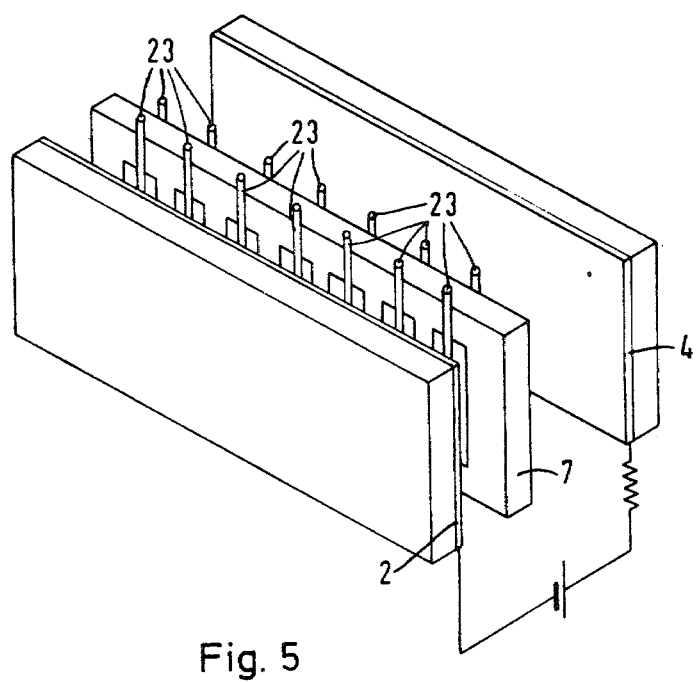
FIG. 5 is a schematic perspective view of a special embodiment of the pickup apparatus.

The image pickup apparatus can also be used as a pickup for measurement data for telemetry transmission of analog variables. In that case it is sufficient if, according to FIG. 5, only a single matrix 7, which receives picture information with only a single row, is arranged between the anode 2 and the cathode 4. This matrix is therefore provided only with column electrodes, since the picture elements then need to be scanned only in one dimension. A pointer reading, for instance, can then be picked up thereby and can be reproduced on the receiving side by a luminous bar display.

Figure 6:
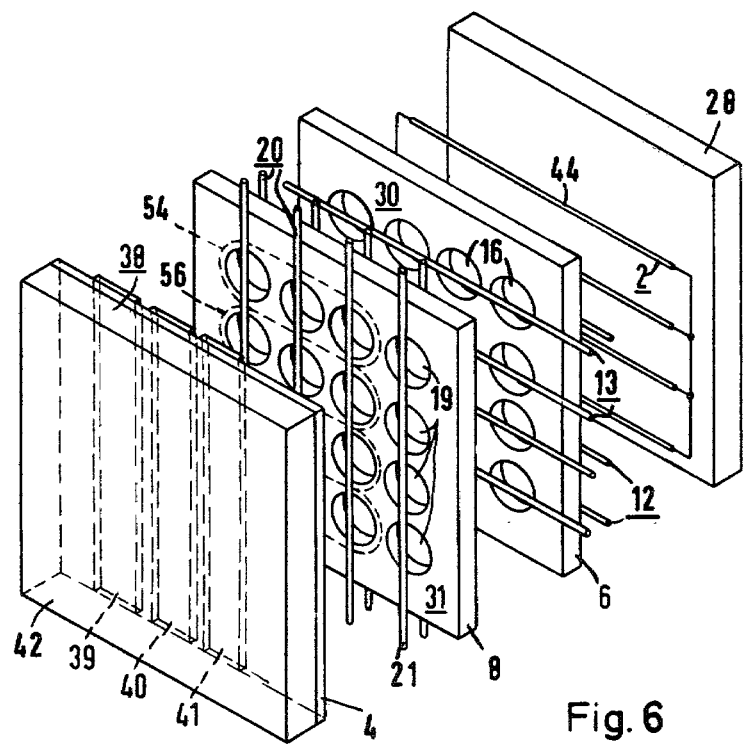
FIG. 6 is a diagrammatic perspective view of a control arrangement according to the present invention.
Figure 7:
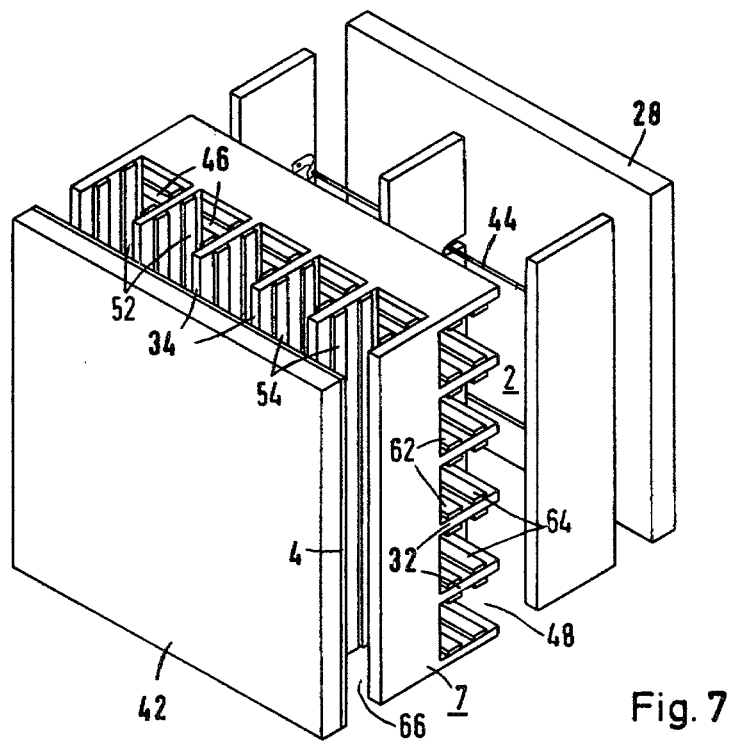
FIG. 7 is a perspective view of a special embodiment of a matrix with the control electrodes.

In FIG. 6, a vacuum display device which contains a thermal cathode 2', a hole matrix 6 with electrodes 12 and 13 for row stepping, a further hole matrix 8 with electrodes 20 and 21 for column stepping, as well as an anode 4 is shown. The entire arrangement is to be arranged in a closed vacuum system, of which only the front wall 42 and the rear wall 28 are shown in the figure.

The thermal cathode 2', which may perferably consist of heater wires 44, is arranged between the rear wall 28 and the matrix 6 and extends over the entire picture area. The incandescent wires 44 of the thermal cathode 2' run alongside the rows which are formed by the holes of the individual matrices. The holes 16 of the matrix 6, for instance, are to form the top row 30. Columns are the respective rows of holes which are arranged vertically one below the other. The holes 12 of the matrix 8, for instance, form the right hand column 31 of the matrix 8. Between the thermal cathode 2' and the anode 4, a constant voltage of, say, 3 kV is applied, which accelerates the electrons released from the cathode through the holes of the two matrices toward the anode and therefore, to the fluorescent screen of the display device. The magnitude of the anode voltage is chosen so that sufficient brightness on the picture screen is obtained. For black and white reproduction, sensitive flourescent layers such as, for instance, zinc oxide can be used in order to keep the anode voltage low.

Since the color reproduction, 3 color components red, green and blue are required, three adjacent matrix points are available as a color triad for dot information. Therefore, the control electrodes 20 and 21 for the column control, which serves for stepping horizontally, form three groups as far as color is concerned, namely one for red, one for blue and one for green. One of these groups is to relate, for instance, to the first three columns arranged at the matrix in FIG. 6, of which the associated holes of the matrix 8 are provided with a dashed frame. The upper holes of the matrix 8, provided in the figure with a dashed frame 54 then form a color dot on the anode 4. In the same manner, the next holes 56 of the column electrodes 20 and 21 likewise form a color dot on the anode 4. For this purpose, the anode 4 is provided with a special overlay 38. This overlay may consist, for instance, of stripes which are assigned to the individual column electrodes 20 and 21 and of which only 3 are indicated in the figure and are designated as 39 to 41. These stripes are adapted to the columns of the matrix 8 as to shape and size. The stripes 39 to 41 are assigned to the groups 54 and 56 and consist of a material which reproduces one of the primary colors, green, blue or red, respectively, especially of green or blue or red phosphor. In the practical embodiment, the width of the stripes 39 to 41 will be, say a few tenths of a millimeter, for instance, about 0.3 mm. Besides being in the form of the stripes of the overlay 38, however, the latter may also consist of other geometrical structures, e.g., individual squares, rectangular or circular overlays. These overlays are then arranged for one color, respectively, one below the other, in the direction of the stripes 39 to 41.

In the embodiment according to FIG. 6, all control electrodes are shown as wires. However, the electrodes can also consist of flat stripes, which can be prepared, for instance, by vapor deposition of conductor material on a respective flat side of the hole matrix in question.

Figure 8:
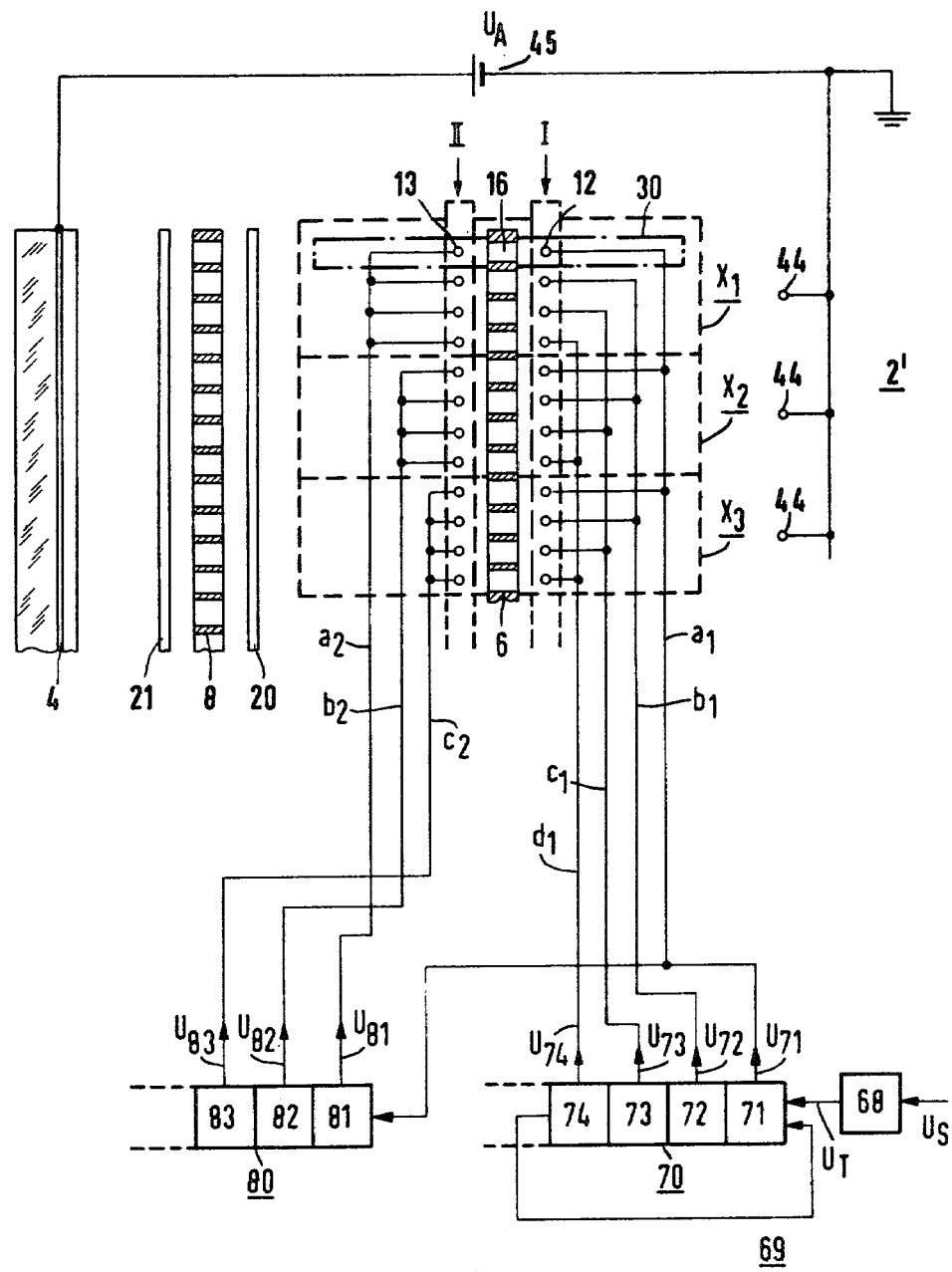
FIG. 8 shows the circuit of the electrodes for row control.

In the embodiment of the vacuum display device according to FIG. 8, which is of similar construction to the embodiment of FIG. 2, the thermal cathode 2' and the anodes are arranged, as in FIG. 6, with a special embodiment of a matrix 7 between the walls 42 and 28 of a vacuum system. The matrix 7 can consist, for instance, of a flat glass body which is provided on one of its flat sides with vertical slots 46 and on the opposite flat side with horizontal slots 48. There are formed, by the unremoved material of the matrix 7, ribs 34, on which electrodes 52 and 54, respectively, in wire or strip form, which serve for column control, are arranged vertically and parallel to each other in such a manner that the electrodes 52 are situated in one plane and the electrodes 54 in a further plane parallel thereto. These electrode planes are arranged one behind the other in the direction of motion of the electrons emitted by the thermal cathode 2'.

In a similar manner, there are formed on the opposite flat side of the matrix 7, by the unremoved parts of the slots 48, ribs 32 which are provided with electrodes 62 and 64, respectively. The electrodes 62 and 64 are arranged horizontally with respect to the matrix 7 and serve for row control. The depth of the slots 46 and 48 can now advantageously be chosen so that a hole 66 is generated at each of their intersections within the matrix 7. These holes then serve for controlling the electron motion from the cathode 2' to the anode 4, which constitutes the picture screen of the display device.

In the control arrangement according to FIG. 8 for a vacuum display device according to the present invention, the thermal cathode 2', the first matrix 6, the electrodes 12 and 13 for row control, the second matrix 8 and the electrodes 20 and 21 for column control, and the anode with 4, corresponding to the design according to FIG. 6 are shown. A d-c voltage source 45 which supplies an anode voltage $U_A$ of, say, 3 kV, is connected between the cathode 2' and the anode 4. The row electrodes 12 are arranged in a plane I and the row electrodes 13 in a plane II. The control arrangement also includes a clock generator 68 of a control unit 69, which delivers clock pulses $U_T$ at its output. These are sent into a shift register 70 which is preferably designed as a ring counter and the stages of which are designated 71 to 74. If the display device is used for reproducing television pictures, the clock pulses $U_T$ can be taken from the video signal. The ring counter 70 controls the row electrodes 12 in the plane I. Another shift register 80, which may preferably likewise be designed as a ring counter and the stages of which are designated as 81 to 83, controls the row electrodes 13 in plane II.

Of the row electrodes 12 in the plane I, the first, fifth and ninth, as seen from the top, i.e., from the first row, form an electrode group $a_1$. They are provided with a common lead and are connected to the stage 71 of the shift register 70.

In a similar manner, the second, sixth and tenth electrode form a further control group $b_1$; they are provided with a common lead and are connected to the stage 72. The third, seventh and eleventh electrode form a third control group $c_1$, which is connected to the stage 73. A fourth control group $d_1$ is formed by the fourth, eighth and twelfth row electrode. This group is connected to the stage 74.

In the plane II with the electrodes 13, each four successive electrodes are tied together to form a control group $a_2$ and are connected to the stage 81 of the shift register 80. Similarly, the electrodes of the control group $b_2$ are connected to the stage 82 and the third electrode group $c_2$ to the stage 83. In the same manner, electrodes associated with further rows can be connected to the control groups in both planes I and II.

If, for advancing the picture elements, the control electrodes were connected individually, one plane of electrodes would be sufficient for stepping the rows and columns, but the number of switching and control elements would be correspondingly high since, then, each individual control electrode would require an electronic switching element, for instance, a transistor. According to the present invention, the electrodes for the row, and optionally, also for the column stepping are therefore arranged in several planes, the electrodes of which are tied together in groups in a special manner. Each of the electrodes 12 and 13 can be switched between two voltage levels relative to the cathode 2. The one voltage level, for instance, zero volts, makes the holes of the matrix 6 of the associated row passable for the electrons toward the anode 20, which is the fluorescent screen. The other level, for instance, $-5$ V, cuts off the electrons.

Only if all the electrodes associated with the same picture element are switched to "pass" can the electrons get through the matrix hole associated with the picture element.

The stepping along of the rows is accomplished by clock pulses of a control voltage, the period of which corresponds to the duration of the lighting up of a row. The clock pulses are taken from the clock generator 68 or, in the case of television picture reproduction, from a video signal and cause the shift register 70 to step its output pulses $U_{71}$ to $U_{74}$ along sequentially from stage to stage.

Figure 9:
FIGS. 9 to 16 illustrate the signal waveforms.
Figure 10:
Figure 11:
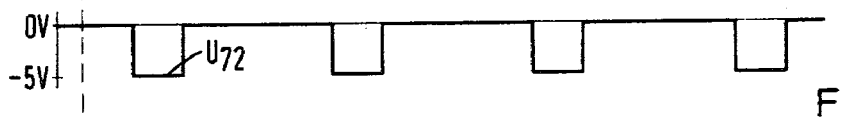
Figure 12:
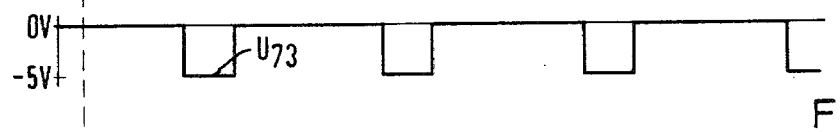
Figure 13:
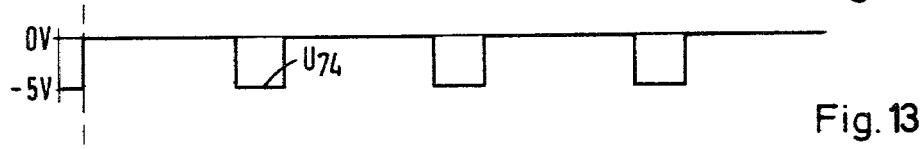
Figure 14:
Figure 15:
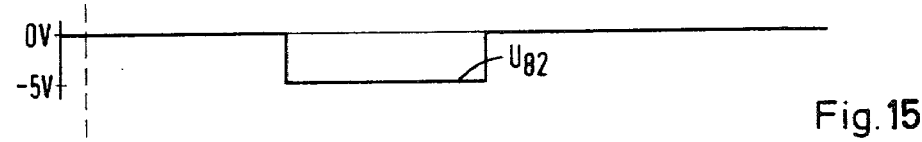
Figure 16:

In the diagram according to FIG. 9, in which the control voltage $U_S$ is plotted versus the time t, a clock pulse $U_T$ is to be transmitted at the time $t_o$ by the clock generator 68 to the first stage 71 of the shift register 70. This clock pulse $U_T$ triggers the shift register 70 and the stage 71 delivers an output pulse $U_{71}$, with a potential of, for instance, $-5$ V relative to the cathode, to the associated control group $a_1$ of the row electrodes 8 in the plane I. This output $U_{71}$, the length of which from $t_o$ to $t_1$ determines, as shown in FIG. 10, the duration of brightness L of the upper row and is equal to the period T of the clock pulse $U_T$, is simultaneously fed to the shift register 80 as an input signal. As shown by FIG. 14, the first stage 81 of the shift register 80 thereupon delivers an output pulse $U_{81}$, which is fed to the electrodes of the first control group $a_2$ in plane II. The luminescence duration L of a row will be 64 usec, for instance, for 625 lines and 25 frames per second. The control signal set for the control phases of the electrodes in plane II by the shift register 80, however, is present until all the control groups in the plane I have been addressed sequentially. Between $t_o$ and $t_1$, therfore, only the two control electrodes associated with the upper row carry a pass signal simultaneously, and only this row is therefore keyed bright. At the time $t_1$, a new control signal $U_{72}$ is fed from the stage 72 to the second control group $b_1$ of plane I with a new clock pulse $U_T$ as shown on FIG. 11 since the second electrode, associated with this group of rows, of the control group $a_2$ in plane II as per FIG. 14 still has a "pass" signal, line 2 will light up until, at the time $t_2$, the electrode group $c_1$, as shown by FIG. 12, is driven by the control signal $U_{73}$. Similarly, the stage 74 will address the associated control group $d_1$ of plane I with its output signal $U_{74}$ at the time $t_3$ as shown by FIG. 13 with the new clock pulse $U_T$ and the fourth row will be lit up, as the control group $a_2$ in plane II still carries a pass signal according to FIG. 14 due to its control signal $U_{81}$. Similarly, a new control pulse $U_{71}$ is fed to the associated electrode group $a_1$ in plane I at the time $t_4$, according to FIG. 10; this control pulse simultaneously triggers the shift register 80 for controlling plane II. This shift register addresses, as shown by FIG. 15, the control group $b_2$ with its output pulse $U_{82}$. After traversing the row advance through the second control phase, the stage 83 of the shift register 80 drives the third control group $c_2$ of the electrodes 10 in plane II, with the control pulse $U_{83}$ at the time $t_5$ as shown by FIG. 16 with the next control pulse $U_{71}$.

For the customary television picture with a 625-line system, the grouping of the electrodes can also simply be chosen so that in the reproduction of the television picture, first the uneven and the even numbered lines are scanned.

The column control of the device, i.e., the scanning of the picture elements of each row (line) can be accomplished in the same manner as the row control. The stepping velocity of the column control, i.e., the frequency of the clock voltage $U_T$, must be chosen high enough so that during the lit-up time of a row, all picture elements of the row are driven sequentially. If the brightness of the picture screen is not sufficient with dot wise control, the picture information of an entire row can be put in temporary storage in a multistage interim register. Subsequently, all dot signals of a row are then fed simultaneously to the column electrodes in a plane, each of which is connected with one of the shift register outputs.

Brightness control of the display device for television picture reproduction can be accomplished through a further vertically installed electrode plane or also by means of the electrode system already provided for the column control by amplitude modulating the column control pulses with the brightness. If the anode voltage can be kept low enough, the brightness can also be controlled in the anode circuit.

The flat display device can also be used for displaying time varying quantities. The horizontally arranged electrode system then serves for the Y-deflection and the vertically arranged electrode system for the X-deflection. The time base can be controlled by means of one of the stepping methods.

Figure 3:
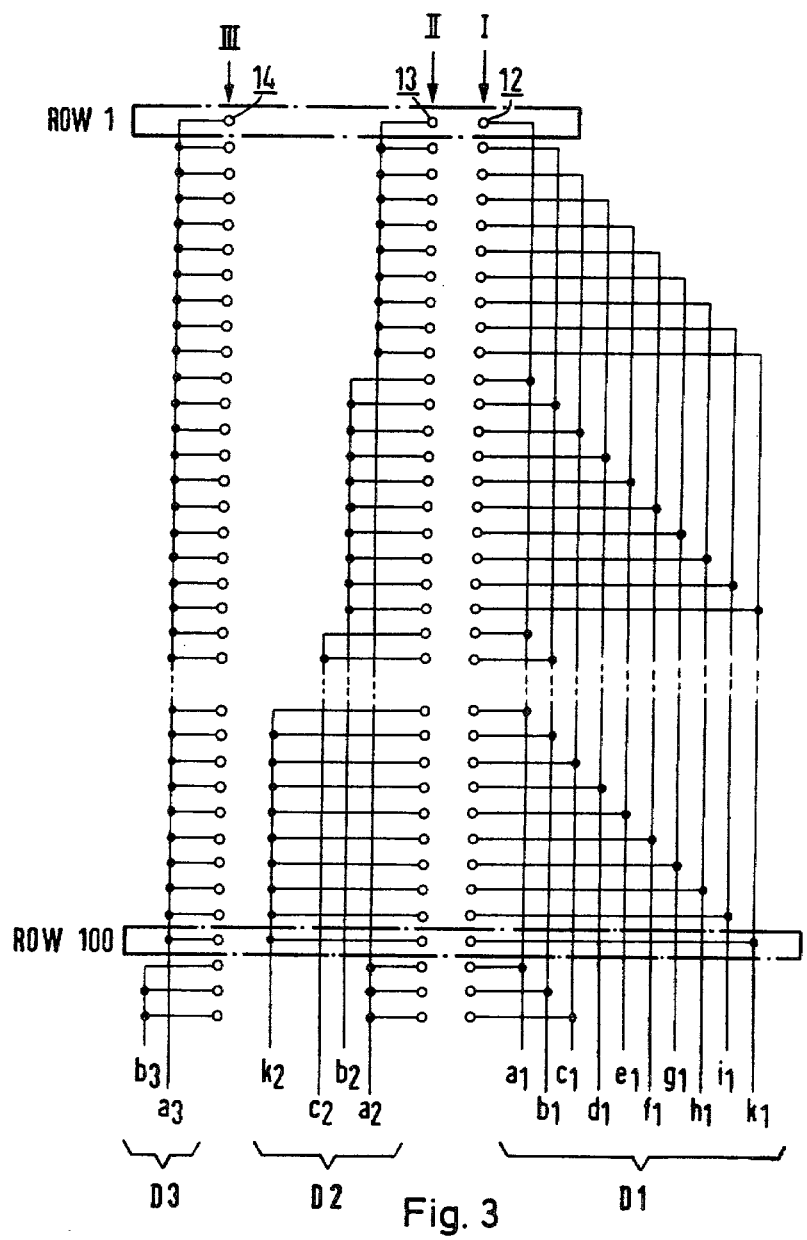
FIG. 3 shows the connection of the electrodes for row scan with decimal coded control signals in an apparatus according to FIG. 2.

By arranging the row electrodes in 3 planes I to III as per FIG. 3, control of the display by decimal code is also possible as described above.

For each decade $D_1$–$D_3$ of FIG. 3, one respective shift register can be provided which is preferably connected as a ring counter and switches back to its first stage after the signal has run through it once. These 3 ring counters then each have 10 control stages. The electrodes of the first control group in plane II receive control signal which causes the electrodes in the respective rows to pass until the electrodes of all control groups of plane I are switched through sequentially. After the signal has run through the first 10 lines, the second control group of plane II receives its signal which lasts until all control groups of plane II have again been stepped through sequentially. From the electrodes of plane III, the electrodes of the first control group, which are associated with the electrodes of rows 1 to 100, receive a pass signal for the electrons until the control groups of plane I have been switched through sequentially 100 times in 10 control phases and accordingly, also the control groups in plane II 10 times in one control phase. For brightening 100 row electrodes of plane I, therefore only 10 signal changes are necessary for the electrodes of plane II and correspondingly, only a single signal of appropriate duration is required for the electrodes of plane III.

What is claimed is:

1. In apparatus which contains a cathode for electron emission and an anode on which the electrons impinge, an improved scanning system comprising:
   (a) at least one hole matrix having therein a plurality of holes, arranged in rows and columns, disposed between the cathode and the anode for row and column control of the electron stream; and
   (b) at least two separately controllable sets of electrodes disposed in at least two different planes parallel to the plane of said hole matrix for control of the holes in said matrix, with the electrodes in one of said planes arranged in plurality of groups each group comprising electrodes which are at a predetermined spacing from each other, said spacing being at least three rows or three columns, each of said groups being jointly controllable and the electrodes in a further plane grouped in jointly controllable electrode groups which comprise at least three adjacent electrodes.

2. Apparatus according to claim 1 wherein more than two electrode planes are associated with a common hole matrix.

3. Apparatus according to claim 2 wherein said hole matrix comprises a member having horizontal grooves on one side and vertical grooves on the other side, said grooves running respectively in the direction of the rows and columns, said electrodes being disposed within said grooves, and wherein the point of intersection of electrodes on opposite sides of said matrix are always at a hole in said matrix.

4. Apparatus according to claim 1 wherein the number of electrode groups for the rows and columns is the same in all planes.

5. Apparatus according to claim 4 wherein, with a number of rows Z in each individual plane $E$, the number of electrode groups is an equal the $E\sqrt{Z}$.

6. Apparatus according to claim 1 wherein said apparatus comprises an image pick-up apparatus, said cathode comprises a photocathode for electron emission and further including an electrical component coupled in the anode circuit having a voltage drop which is determined by the electron stream flowing to said anode, from which component a video signal can be obtained.

7. Apparatus according to claim 6 wherein said apparatus comprises an image reproduction device.

8. Apparatus according to claim 1 wherein said apparatus comprises a flat display device and wherein said cathode comprises a thermal cathode.

9. Apparatus according to claim 8 wherein for each of the holes of the individual columns of said matrix at least two separately controllable electrodes are provided, said electrodes being arranged in separate planes parallel to the flat sides of said hole matrix.

10. Apparatus according to claim 9 wherein said anode contains fluorescent overlays in alignment with each three adjacent column electrodes, the fluorescent overlays each being adapted to provide one of the three primary colors.

11. Apparatus according to claim 10 wherein said overlays comprise stripes.

12. A method of operating scanning apparatus which is disposed within a vacuum-tight enclosure and which includes a cathode for electron emission, an anode on which the electrons impinge and a scanning system which includes at least one hole matrix having therein a plurality of holes, arranged in rows and columns, disposed between the cathode and the anode for row and column control of the electron stream; and at least two separately controllable sets of electrodes disposed in at least two different planes parallel to the plane of said hole matrix for control of the holes in said matrix with the electrodes in one of said planes arranged in plurality of groups each group comprising electrodes which are at a predetermined spacing from each other, said spacing being at least three rows or three columns, each of said groups being jointly controllable and the electrodes in a further plane grouped in jointly controllable electrode groups which comprise at least three adjacent electrodes comprising;
   (a) sequentially and repetitively feeding control pulses which permit the electrons to pass to the individual control groups of said one electrode plane for sequential control of the rows;
   (b) simultaneously supplying a control pulse to a group of the control electrodes of the next plane, said pulse having a length which is equal to the time required to feed pulses to all of the individual control groups of said one plane;
   (c) sequentially feeding said pulse to subsequent groups in said next plane in synchronism with the feeding of a first control pulse to the first of the individual control groups in said one plane; and
   (d) similarly simultaneously sequentially and synchronously feeding to control groups in any further planes a control pulses having a duration corresponding to the duration required to sequence through all control groups of the previous plane.

* * * * *